May 23, 1944.  B. HOPPS  2,349,432

SPARKING PLUG

Filed Oct. 6, 1942

Inventor
B. Hopps
By Glascock Downing & Seebold
Attys

Patented May 23, 1944

2,349,432

UNITED STATES PATENT OFFICE 2,349,432

SPARKING PLUG

Bernard Hopps, Rugby, England, assignor to Lodge Plugs Limited, Rugby, England

Application October 6, 1942, Serial No. 460,999
In Great Britain February 26, 1942

1 Claim. (Cl. 123—169)

This invention relates to sparking plugs for internal combustion engines, and of the type comprising a two part electrode mounted within a ceramic insulator and having a sealing substance situated between the adjacent ends of the electrode parts.

The object of the invention is to provide improved means for sealing the bore of the insulator and effecting electrical connection between the electrode parts.

The invention comprises the combination of a ceramic insulator, a pair of electrode parts arranged within a bore in the insulator, a plain glass seal situated between the adjacent ends of the electrode parts, and a metal wire extending through the seal and serving to effect electrical connection between the electrode parts, the glass and wire having substantially the same coefficient of thermal expansion as the insulator, and the glass serving also as the sole means for securing at least the inner electrode part in position within the insulator.

Figure 1:

In the accompanying sheet of explanatory drawings:

Figure 1 is a sectional view illustrating a seal adapted for carrying out my invention.

Figure 2:
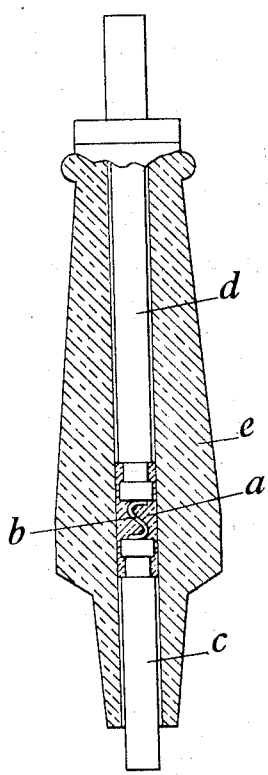
Figure 3:
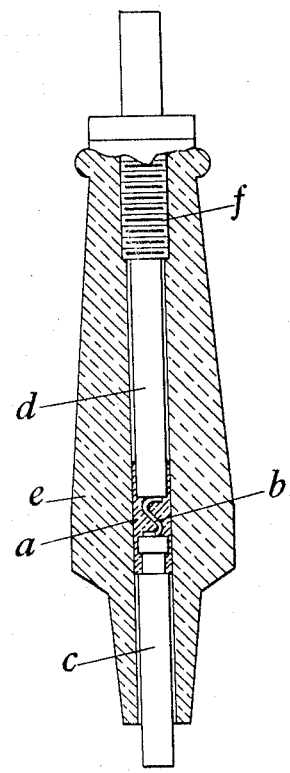

Figures 2 and 3 respectively illustrate two forms of combined insulator, electrode parts and seal embodying my invention.

In one manner of carrying the invention into effect, I first form a cylindrical pellet $a$ (Figure 1) of powdered glass, and along its axis the pellet is formed with a hole of small diameter. The glass powder is temporarily held together by any convenient binder such as wax, and is fired at a temperature of about 800° C. Any convenient glass may be used, but Pyrex glass is found convenient for use in a ceramic insulator having alumina as its chief ingredient. After firing, a short length of any convenient wire $b$ of about .010 inch diameter is inserted through the pellet and its ends are bent over to hold it in position. Molybdenum, nickel-iron (about 42% nickel) or nickel-iron coated with copper, are convenient materials, as their co-efficient of thermal expansion is of the same order as those of the pellet and the insulator.

In the assembling of the component parts of the sparking plug, the electrode part $c$ (Figure 2 or 3) which serves as or carries the sparking tip, and the other part $d$ which serves as or for connection to the external terminal, are placed in position within the ceramic insulator $e$, with the pellet $a$ between the adjacent ends of the electrode parts. The assembly is then heated to about 900° C. to render the pellet plastic, and by pressure applied to the ends of the electrode parts the pellet is expanded into tight contact with the inner surface of the insulator bore, thus forming the required gas-tight seal. As the inner ends of the electrode parts are also in contact with the ends of the wire, they are electrically connected by the wire. Under the action of the pressure applied to the pellet the wire usually becomes crumpled as indicated in Figures 2 and 3.

In the example shown in Figure 2 the insulator $e$ has a bore of uniform diameter, and the adjacent ends of the electrode parts $c$, $d$, are formed with annular grooves into which some of the material of the pellet can flow while it is in the plastic condition and so secure the electrode parts in position. The example shown in Figure 3 differs in that the upper electrode part is screw-threaded at $f$ for engagement with a screw-threaded portion of the insulator bore, and the inner end of the electrode part $c$ only is grooved to effect an anchorage with the pellet. These constructional details, however, form no part of my invention and may be varied. For example, the lower end of the bore of the insulator shown in Figure 2 may be stepped and a head may be formed on the inner end of the electrode part, the underside of the head being in contact with the step in the bore.

By this invention the required sealing of the interior of the ceramic insulator to prevent escape of gases along the bore of the insulator, and the electrical connection between the adjacent ends of the electrode parts, are effected in a very simple and satisfactory manner.

Having thus described my invention what I claim as new and desire to secure by Letters Patent is:

For use in a sparking plug, the combination of a ceramic insulator, a pair of electrode parts arranged within a bore in the insulator, a plain glass seal situated between the adjacent ends of the electrode parts, and a metal wire extending through the seal and serving to effect electrical connection between the electrode parts, the glass and wire having substantially the same coefficient of thermal expansion as the insulator, and the glass serving also as the sole means for securing at least the inner electrode part in position within the insulator.

BERNARD HOPPS.